(12) United States Patent
Carroll et al.

(10) Patent No.: US 8,382,138 B2
(45) Date of Patent: Feb. 26, 2013

(54) HITCH ASSEMBLY FOR CONVERTING A WHEELBARROW TO A TOWABLE TRAILER

(75) Inventors: David W. Carroll, Grantsburg, WI (US); Robert Cahlander, Brooklyn Park, MN (US)

(73) Assignee: David W. Carroll, Grantsburg, WI (US)

( * ) Notice: Subject to any disclaimer, the term of this patent is extended or adjusted under 35 U.S.C. 154(b) by 0 days.

(21) Appl. No.: 13/185,812

(22) Filed: Jul. 19, 2011

(65) Prior Publication Data

US 2012/0187657 A1    Jul. 26, 2012

Related U.S. Application Data

(60) Provisional application No. 61/365,648, filed on Jul. 19, 2010.

(51) Int. Cl.
*B62K 27/00* (2006.01)
(52) U.S. Cl. .................. 280/292; 280/415.1; 280/288.4
(58) Field of Classification Search ............... 280/415.1, 280/292, 288.4, 47.31
See application file for complete search history.

(56) References Cited

U.S. PATENT DOCUMENTS

| 4,052,079 A | 10/1977 | Lehman |
| 4,155,678 A | 5/1979 | Lehman |
| 4,281,950 A | 8/1981 | Lehman et al. |
| 4,729,574 A | 3/1988 | Tipke |
| 4,740,008 A | 4/1988 | Johnson |
| 4,789,171 A | 12/1988 | Porter |
| 5,031,926 A | 7/1991 | Wannamaker |
| 5,509,681 A | 4/1996 | Keller |
| 7,140,630 B2 | 11/2006 | Abel |

FOREIGN PATENT DOCUMENTS

CA    2157266    2/1997

*Primary Examiner* — Kevin Hurley
*Assistant Examiner* — Michael Stabley
(74) *Attorney, Agent, or Firm* — Dicke, Billig & Czaja, PLLC

(57) ABSTRACT

A hitch device for converting a conventional wheelbarrow into a towable trailer. The wheelbarrow includes a tub, handles and at least one wheel. The hitch device includes an elongated tow bar, first and second engagement members, and a vehicle coupling assembly. Each of the engagement members has a handle capture, a cross bar, and a base. The handle capture is configured to slidably receive one of the wheelbarrow handles, and is connected to the cross bar. The base also projects from the cross bar. The first engagement member is separate from the tow bar, whereas the second engagement member is affixed to the tow bar. The handle captures are received over the wheelbarrow handles, respectively, and the bases fastened to one another to connect the first engagement member with the tow bar such that the hitch device is mounted to the wheelbarrow handles in a wedge-like fashion.

4 Claims, 7 Drawing Sheets

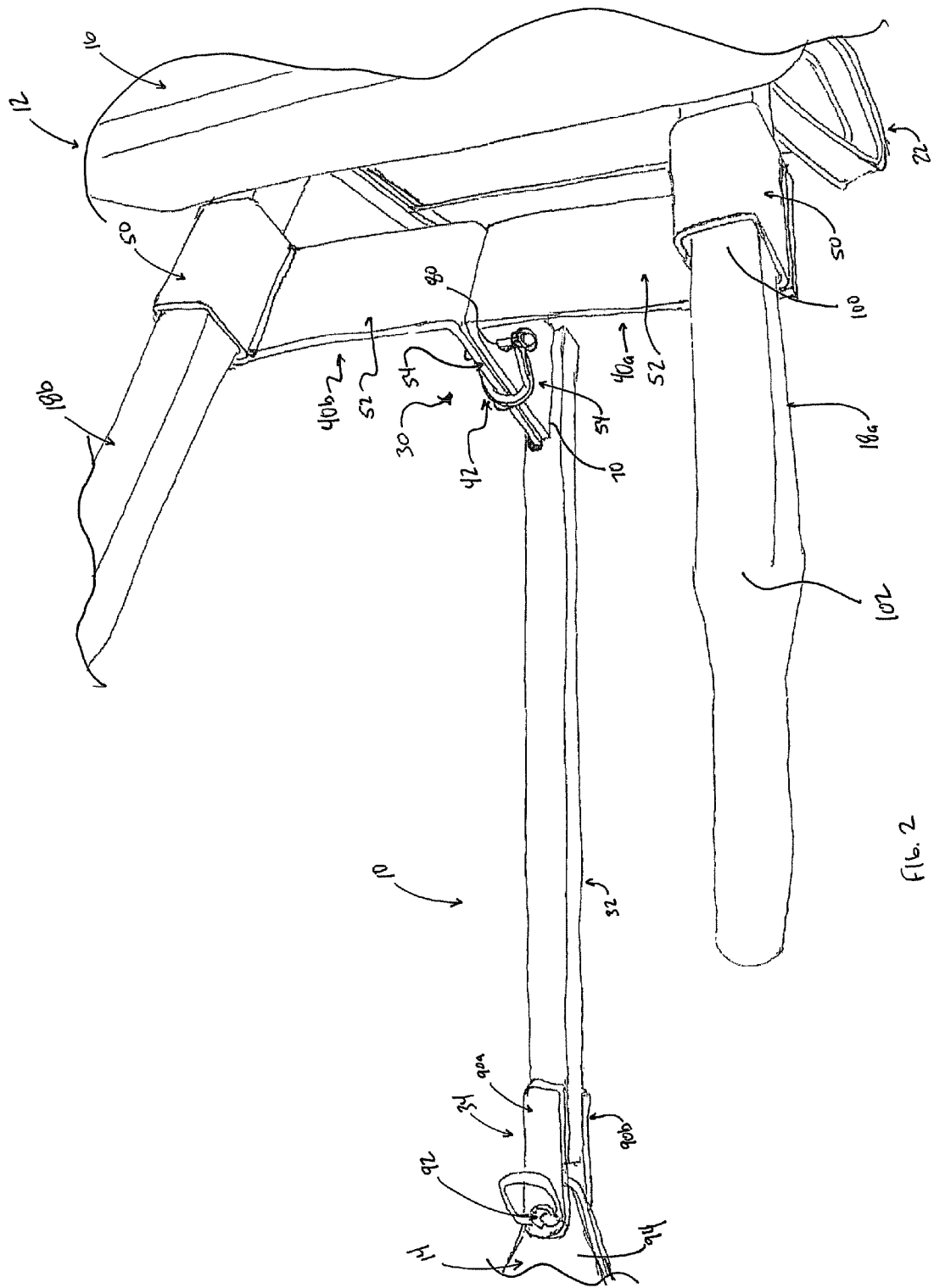

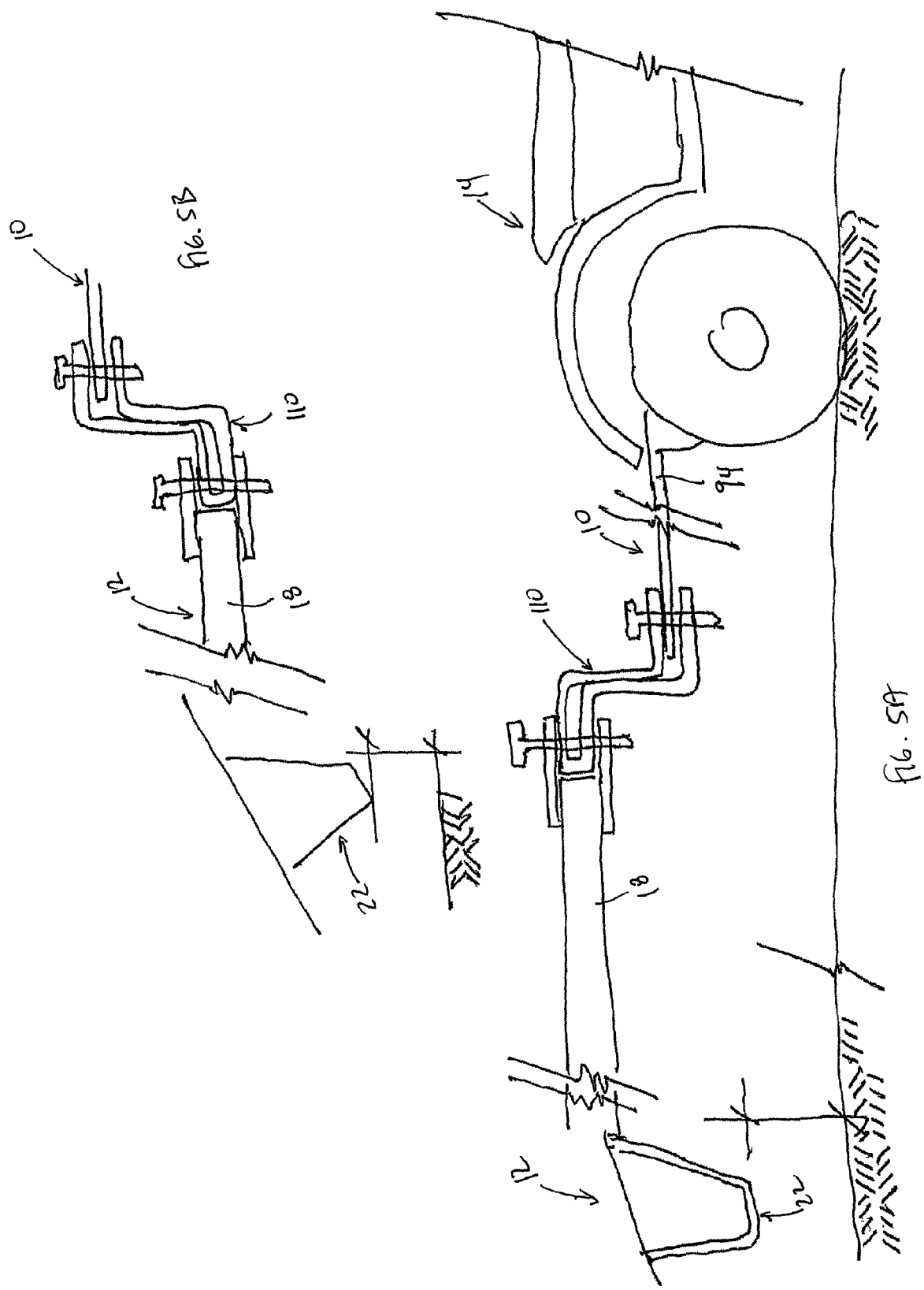

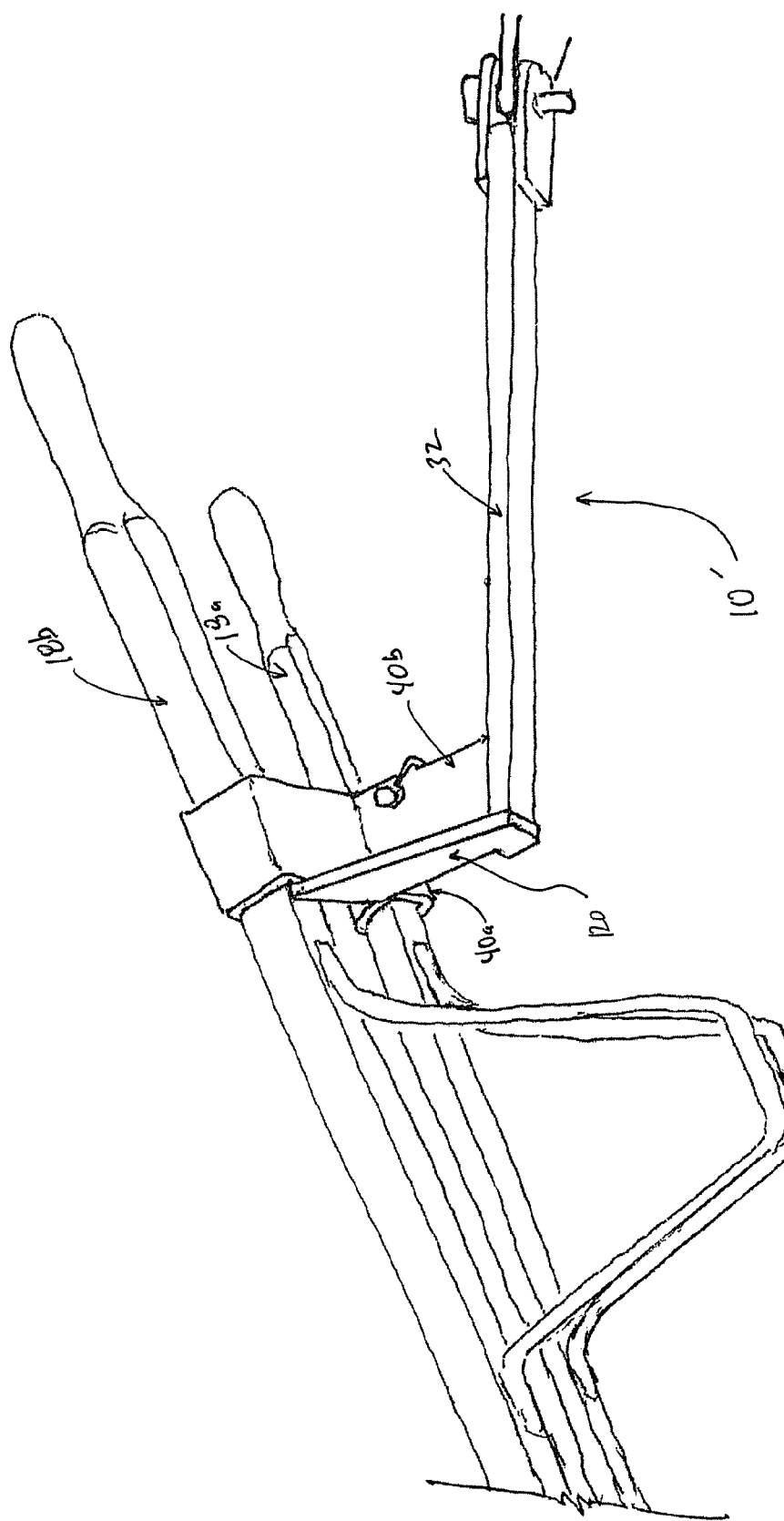

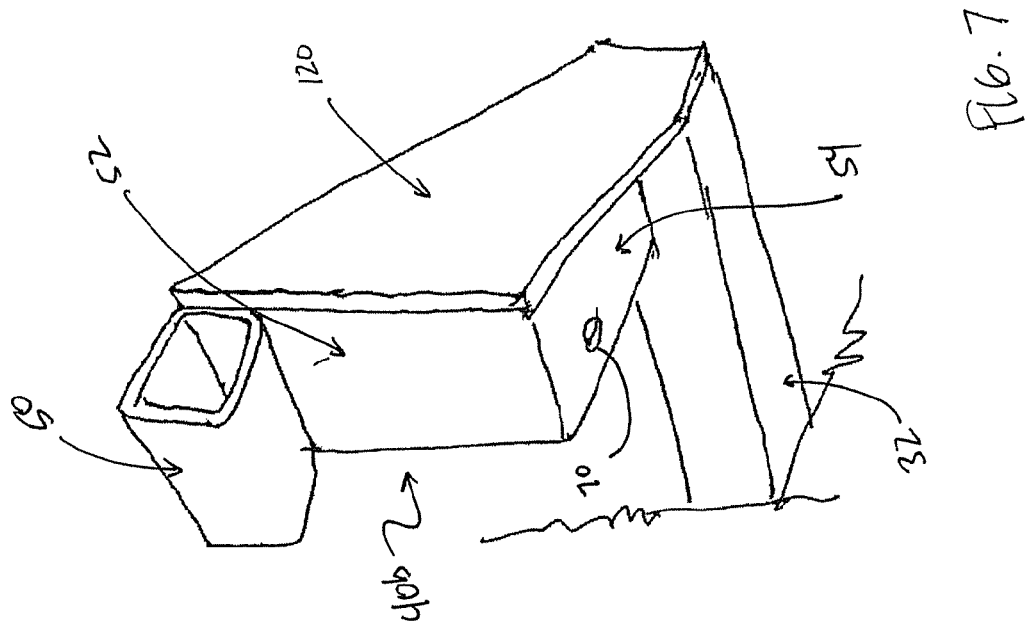

HITCH ASSEMBLY FOR CONVERTING A WHEELBARROW TO A TOWABLE TRAILER

CROSS-REFERENCE TO RELATED APPLICATION

This application claims priority under 35 U.S.C. §119(e) to U.S. Provisional Patent Application Ser. No. 61/365,648 filed on Jul. 19, 2010, and incorporated herein by reference.

BACKGROUND

The present disclosure relates to tow hitches. More particularly, it relates to tow hitches for use with conventional wheelbarrows and small motorized vehicles (e.g., ATVs, riding lawn mowers, etc.).

Individuals hauling materials may choose to use a wheelbarrow or a small trailer pulled by a small vehicle for many applications. They largely make a choice of manual vs. powered based on size and type of job, terrain conditions, availability and cost of equipment, storage limitations, and ease of use. In theory, the ability to use a wheelbarrow also as a towed trailer would provide the user with double-purpose investment, reduce storage space, and offer application options to switch between manual and powered hauling as desired. This need has been recognized, but unfortunately not successfully addressed by others. For example, several patents and published patent applications describe various hitch designs and methods, yet there is currently a lack of common use and widespread availability of the so-described devices in the marketplace. It is therefore perceived the need remains due to the failure of existing methods to achieve desired price, simplicity, and performance, explaining the lack of market share.

It is also believed there is a growing number of small vehicles capable of using an acceptable multi-purposed solution. These include increasing numbers of riding lawn mowers and ATVs. It is further believed individuals are purchasing the more stabile and easier to use two-wheeled wheelbarrows. This combination offers more opportunities to provide a solution for manual and towed formats and should be more readily received if properly conceived.

BRIEF DESCRIPTION OF THE DRAWINGS

FIG. 2 is an enlarged, top perspective view of the hitch device of FIG. 1, as well as portions of the wheelbarrow and motorized vehicle;

FIG. 5A is a side view of the hitch device of FIG. 1 in combination with an optional adaptor in accordance with principles of the present disclosure, as well as portions of the wheelbarrow and motorized vehicle;

FIG. 5B is a side view of the combination hitch device and adaptor of FIG. 5A, with the adaptor in a different orientation;

FIG. 6 is a side perspective view of another hitch device in accordance with principles of the present disclosure, as well as portions of a wheelbarrow and motorized vehicle; and FIG. 7 is a side perspective view of a gusset feature useful with the hitch device of FIG. 6.

DETAILED DESCRIPTION

In general terms, the present disclosure relates to a hitch device or hitch assembly for optionally connecting a two-wheeled wheelbarrow to a small vehicle. The hitch device is composed of opposing and rigid surrounding handle means that are further joined to each other by structural members and to a tow bar. The tow bar terminates at vehicle coupler (e.g., vehicle hitch). When assembled to the two handles provided with conventional wheelbarrows, the hitch device of the present disclosure forms a triangle rigidly providing the required support both vertically and linearly for towing directivity and ground clearance. The surrounds capture the handles at a point along the splayed (upward and outward angled) handles, permitting the resulting triangle assembly to remain stationary without fasteners from hitch to wheelbarrow.

Figure 1:
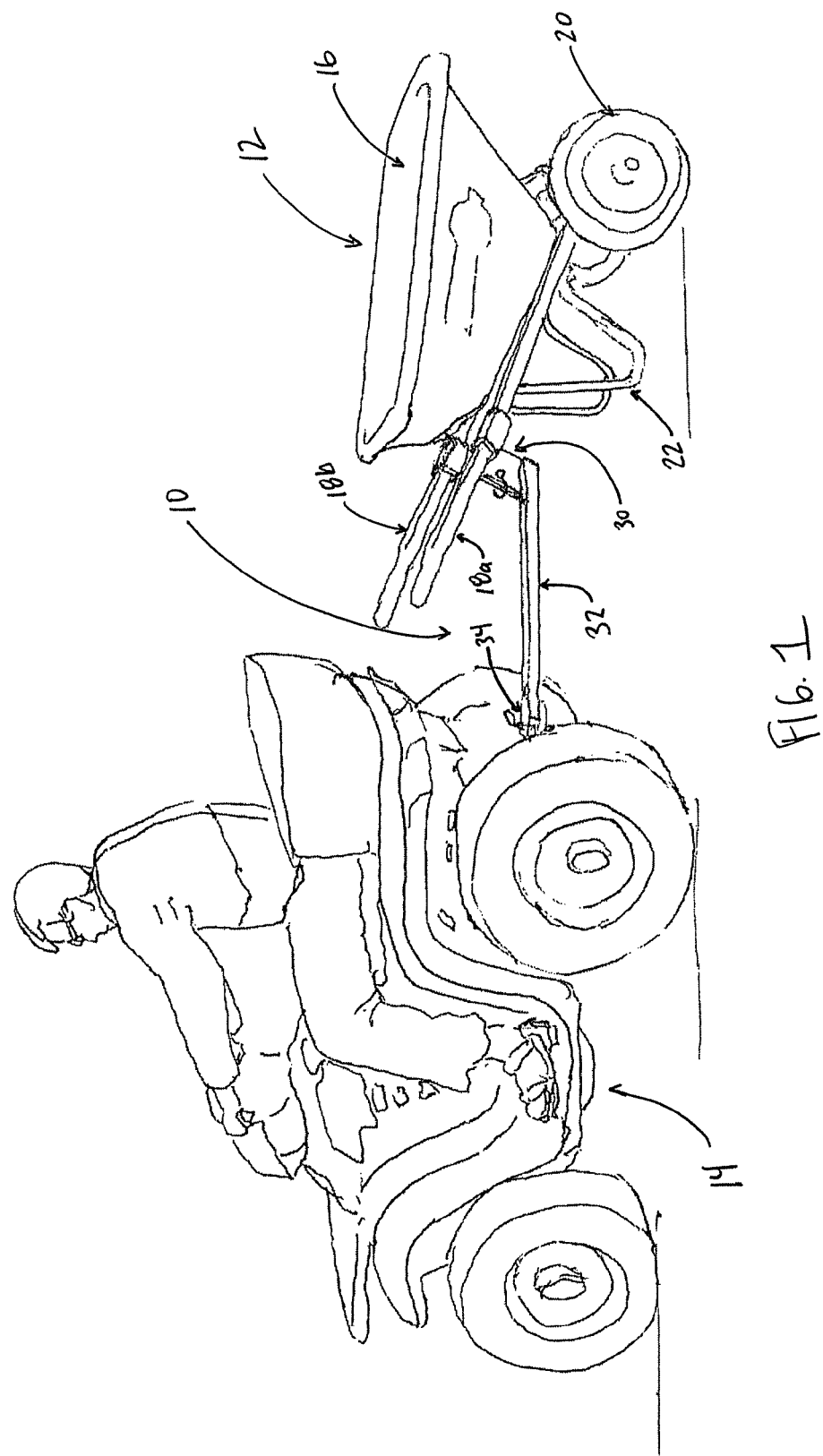
FIG. 1 is a perspective view of a hitch device in accordance with principles of the present disclosure being used to tow a wheelbarrow behind a small motorized vehicles.

With the above in mind, one embodiment of a hitch device 10 in accordance with principles of the present disclosure is shown in FIG. 1. As a point of reference, the hitch device 10 is depicted during use, coupling a conventional wheelbarrow 12 to a small motorized vehicle 14 in a manner permitting towing of the wheelbarrow 12 by the vehicle 14. The hitch device 10 of the present disclosure is in no way limited to any particular configuration or design of the wheelbarrow 12 or the vehicle 14. For example, while the vehicle 14 is depicted as an ATV, the hitch device 10 of the present disclosure is equally useful with other small motorized vehicles such as riding lawn mowers, etc. Generally speaking, the wheelbarrow 12 is of a conventional type, having a tub 16 connected to two handles 18a, 18b and one or more wheels 20. Supporting framework 22 extends downwardly from the tub 16, and resists rolling of the wheelbarrow 12 when rested on the ground. The wheelbarrow 12 can be of any type currently available or in the future developed. Conventionally, however, the handles 18a, 18b project in a generally splayed apart, upward fashion in rearward extension from tub 16 as illustrated more clearly below. Further, the supporting framework 22 is arranged such that in order to easily move the wheelbarrow 12, the framework 22 must be lifted off of the ground (e.g., applying a lifting force on to the handles 18a, 18b that in turn causes the framework 22 to move upwardly, pivoting at an axle of the wheel(s) 20).

With the above understanding of the general parameters associated with the wheelbarrow 12 in mind, the hitch device 10 includes a handle connection assembly 30 (referenced generally), a tow bar 32 and a vehicle coupling assembly 34. Details on the various components are provided below. In general terms, the handle connection assembly 30 is carried by the tow bar 32 and is configured to provide a wedged-type coupling with the handle 18a, 18b of the wheelbarrow 12. The vehicle coupling assembly 34 is attached to the tow bar 32 opposite the handle connection assembly 30, and is configured for pivotable-type coupling with a frame body of the motorized vehicle 14. Upon final assembly, the hitch device 10 provides a rigid connection between the wheelbarrow 12 and the motorized vehicle 14 in a manner that retains the wheelbarrow framework 22 off of the ground. As a result, the wheelbarrow 12 is freely movable with rolling of the wheel(s)

20 (i.e., the framework 22 does not resist movement), such that the wheelbarrow 12 can be towed by the motorized vehicle 14.

As shown in greater detail in FIG. 2, the handle connection assembly 30 includes, in some embodiments, opposing, first and second engagement members 40a, 40b, and a coupling device 42. The engagement members 40a, 40b extend from the tow bar 32 and are selectively connected to respective ones of the wheelbarrow handles 18a, 18b. The coupling device 42 releasably fastens the engagement members 40a, 40b to one another.

In some embodiments, the first and second engagement members 40a, 40b are essentially identical, such that the following description of the first engagement member 40a applies equally to the second engagement member 40b. The engagement member 40a includes a handle surrounding means or handle capture structure 50, a cross bar 52, and a base 54. The handle capture 50 and the base 54 are affixed to, or extend from, opposite sides of the cross bar 52.

Figure 3C:
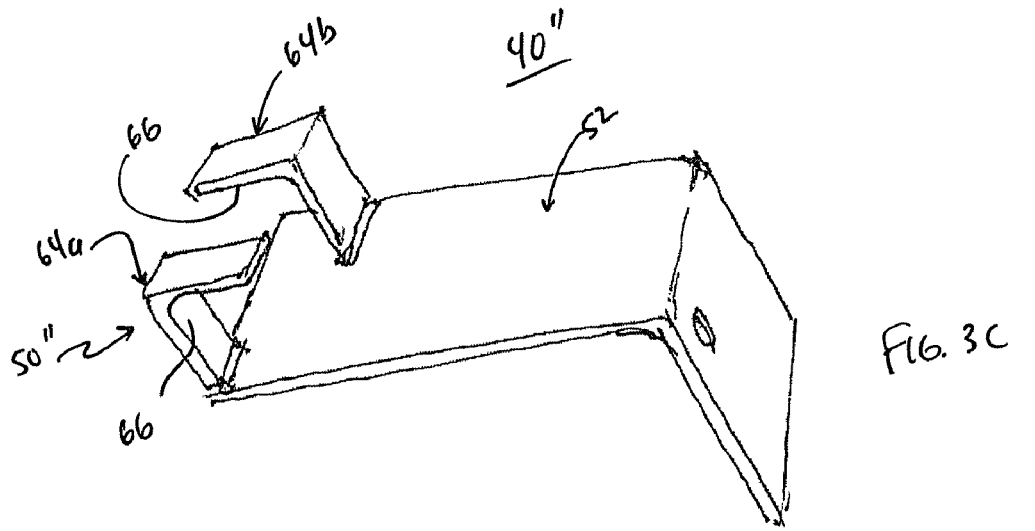
FIG. 3C is a side perspective view of another alternative engagement member portion in accordance with the present disclosure and useful with the hitch device of FIG. 1.
Figure 3A:
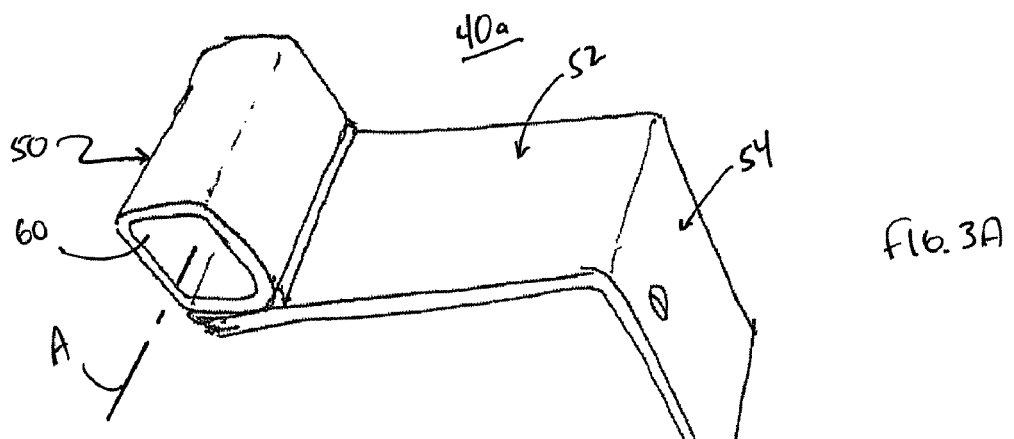
FIG. 3A is a side perspective view of an engagement member portion of the hitch device of FIG. 1.
Figure 3B:
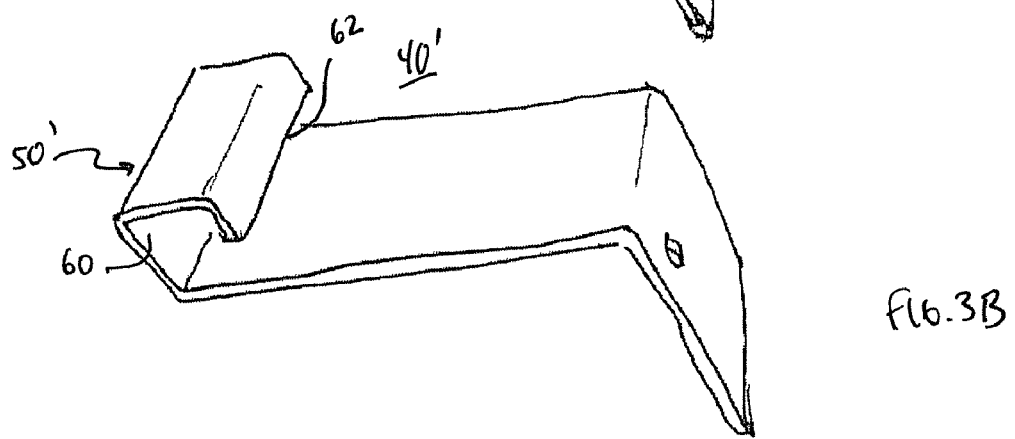
FIG. 3B is a side perspective view of an alternative engagement member portion in accordance with the present disclosure and useful with the hitch device of FIG. 1.

In general terms, the handle capture 50 is configured for slidable assembly over, and temporary engagement with, the wheelbarrow handle 18a. As more fully reflected in FIG. 3A, in some embodiments, the handle capture 50 is a tube or sleeve-type body, defining a square or rectangular shape passage 60 sized and shaped in accordance with the square or rectangular perimeter associated with conventional wheelbarrow handles. Other shapes (e.g., circular, triangular, irregular, etc.) are also acceptable. Further, the handle capture 50 can assume other configurations capable temporary engagement with the wheelbarrow handle 18a (FIG. 2). For example, FIG. 3B illustrates an alternative engagement member 40', including an alternative handle capture 50' in accordance with principles of the present disclosure. The handle capture 50' is a partial sleeve, defining the passage 60 as well as a longitudinal slot 62. In some constructions, the handle capture 50' is formed as a continuous extension of the cross bar 52, but bending the cross bar 52 on to itself. Yet another alternative handle capture 50" is shown in FIG. 3C, and includes two (or more) arms 64a, 64b projecting from the cross bar 52. The arms 62a, 62b are discretely spaced from one another, and collectively define a partial channel 66 (referenced generally) that is otherwise analogous to the passage 60 described above, sized and shaped to slidably receive, and temporarily engage, the wheelbarrow handle 18a (FIG. 2). Other constructions are also envisioned. For example, in yet other embodiments, the handle capture 50, 50', 50" can further include a coupler (e.g., threaded shaft, spring-loaded pin, etc.) that effectuates a more robust engagement with the wheelbarrow handle 18a upon final assembly.

Regardless of exact form, and returning to FIGS. 2 and 3A, the handle capture 50 is maintained by the cross bar 52 at an angle relative to a plane of the base 54. Stated otherwise, a central axis A (FIG. 3A) of the handle capture 50 is non-parallel relative to a plane of the base 54. As made clear below, with this construction, the engagement members 40a, 40b collectively accommodate the normal splaying arrangement of the wheelbarrow handles 18a, 18b in extension from the tub 16. In particular, the angled nature of the handle captures 50 relative to the corresponding base 54 permits assembly of each of the handle captures 50 over a respective wheelbarrow handle 18a, 18b, and the bases 54 being brought into abutting contact.

The cross bar 52 can assume various forms, and is generally a structurally robust material (e.g., steel plate). The cross bar 52 serves to rigidly retain a spatial arrangement of the handle capture 50 relative to the base 54, and is capable of maintaining a structural rigidity in the presence of expected forces (e.g., the wheelbarrow 12 loaded with 100 or more pounds of material and being towed at speeds in excess of 20 miles per hour).

Figure 4:
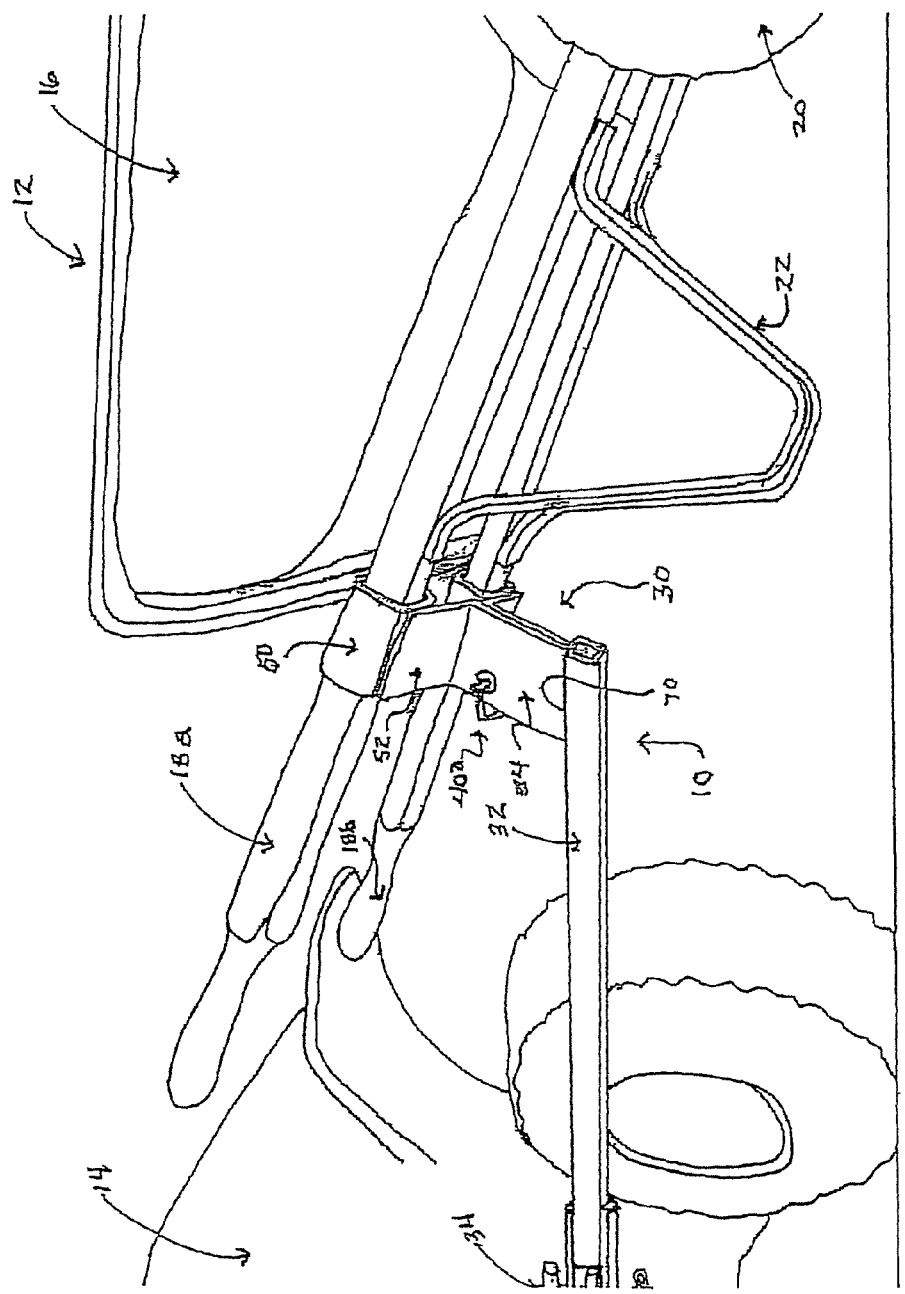
FIG. 4 is a bottom perspective view of the hitch device of FIG. 1, as well as portions of the wheelbarrow and motorized vehicle.

The base 54 projects from the cross bar 52 in a direction opposite the handle capture 50. In some embodiments, the base 54 is integrally formed with the cross bar 52 (e.g., the cross bar 52 and the base 54 are collectively formed by binding a metal plate or rod); alternatively, the cross bar 52 and the base 54 can be separately formed and subsequently assembled. Regardless, a bottom end 70 of the base 54 is configured for interfacing with the tow bar 32 in a manner that generates or promotes a tilted (non-parallel) arrangement of the cross bar 52 relative to an axis of the tow bar 32 upon final assembly. For example, with respect to the base 54 of the first engagement member 40a, the base 54 is constructed such that the bottom end 70 can be placed in generally planar contact with the tow bar 32. The base 54 of the first engagement member 40a is not permanently affixed to the tow bar 32; rather, mounting of the hitch assembly 10 to the wheelbarrow 12 (described in greater detail below) brings the bottom end 70 of the first engagement member 40a into contact with the otherwise planar top surface of the tow bar 32. As best shown in FIG. 4, the plane of the bottom end 70 is non-parallel relative to a plane of the base 54. As a result, the cross bar 52 (and thus the handle capture 50 carried thereby) extends in a non-parallel fashion relative to an axis or plane of the tow bar 32. Upon assembly to the wheelbarrow handle 18a, then, the engagement member 40a tilts the wheelbarrow handle 18a upwardly (relative to a direction of extension from the tub 16), providing necessary clearance of the wheelbarrow framework 22 above the ground. The base 54 can have various geometries to accomplish the necessary tilt, and is generally configured to accommodate conventional wheelbarrow constructions in tandem with expected vertical elevations of the tow bar 32 relative to ground (e.g., where the tow bar 32 is expected to be close to the ground, the base 54 can have an elevated height and/or angle). In other embodiments, the base 54 can be omitted.

Returning to FIG. 2, unlike the first engagement member 40a, in some embodiments, the base 54 of the second engagement member 40b is permanently affixed to the tow bar 32. For example, the base 54 can be welded, mechanically coupled, etc. to a surface of the tow bar 32. Selective fastening of the engagement members 40a, 40b to one another (and thus of the first engagement member 40a to the tow bar 32) is provided by the coupling device 42. The coupling device 42 can assume various forms (e.g., a cotter pin), with the base 54 of each of the engagement members 40a, 40b incorporating one or more features (e.g., a receiving hole 80) that facilitate deployment of the coupling device 42. Optionally, a rubber or similar material washer (not shown) can be disposed between the bases 54; where provided, the washer can have a variable durometer (e.g., top or bottom) to effectuate desired spacing between the bases 54.

The tow bar 32 can have a variety of forms, and generally comprises a rigid, elongated body (e.g., metal bar, metal tube, etc.). The vehicle coupling assembly 34 similarly can assume various formats capable of effectuating a pivoting type coupling with the motorized vehicle 14. For example, the vehicle coupling assembly 34 can include opposing, spaced apart legs 90a, 90b and a pin 92 as shown. A hitch plate 94 of the motorized vehicle 14 is received between the legs 90a, 90b, with the pin 92 capturing the legs 90a, 90b relative to the hitch plate 94 in a manner allowing pivoting of the tow bar 32 relative to the hitch plate 94. A plethora of other constructions are also acceptable (e.g., the vehicle coupling assembly 34 can be configured for mounting to a ball-type hitch, etc.).

Prior to use, the first engagement member 40a is disassembled from the second engagement member 40b. The hitch device 10 is mounted to the wheelbarrow 12 by sliding the handle capture 50 of the first engagement member 40a over the first wheelbarrow handle 18a, and the handle capture 50 of the second engagement member 40b over the second wheelbarrow handle 18b. As a point of reference, FIG. 2 reflects the conventional splaying arrangement of the wheelbarrow handles 18a, 18b in extension from the tub 16, and can be characterized by a lateral distance to between the handles 18a, 18b at a proximal point 100 (identified on the first handle 18a in FIG. 2) being less than a lateral distance at a distal point 102. Stated otherwise, the handles 18a, 18b spread away from one another. With this splaying relationship in mind, the engagement members 40a, 40b are configured such that with abutting arrangement of the bases 54 against one another, a lateral distance between the corresponding handle captures 50 is less than the lateral distance between the wheelbarrow handles 18a, 18b at the distal point 102. Thus, where the engagement members 40a, 40b both permanently affixed to the tow bar 32, it could be exceedingly difficult to collective slide the handle captures 50 over the corresponding handles 18a, 18b. However, because the first engagement member 40a is initially separate from the second engagement member 40b/tow bar 32 the handle capture 50 of the first engagement member 40a is easily placed over the first handle 18a, as is the handle capture 50 of the second engagement member 40b over the second handle 18b.

Once the engagement members 40a, 40b have been advance along the corresponding handle 18a, 18b to the location of FIG. 2, the bases 54 are generally in contact with one another, and the bottom end 70 of the first engagement member 40a generally contacts the tow bar 32. The coupling device 42 is then utilized to fasten the engagement members 40a, 40b to one another. Once so-fastened, the hitch device 10 can no longer be removed from the wheelbarrow 12. In particular, due to the splaying arrangement of the wheelbarrow handles 18a, 18b as described above, attempted movement of the engagement members 40a, 40b away from the tub 16 (e.g., via a pulling force applied to the tow bar 32) causes the corresponding handle captures 50 to slide along the respective handle 18a or 18b in a direction away from the hub. However, because the lateral distance between the two handle captures 50 is now fixed, the handle captures 50 cannot be collectively advanced beyond a point where the lateral distance between the handles 18a, 18b is greater than the lateral distance between the handle captures 50. Effectively, then, a wedged-type mounting of the engagement members 40a, 40b relative to the wheelbarrow handles 18a, 18b is achieved.

With reference to FIGS. 1 and 4, the vehicle coupling assembly 34 is attached to the motorized vehicle 14 as described above. In this regard, and because the hitch assembly 10 is mounted to the wheelbarrow handles 18a, 18b, lifting of the tow bar 32 as part of the vehicle mounting operation causes the wheelbarrow 12 to pivot or lift about the axis of the wheel(s) 20. Upon final assembly, then, the hitch device 10 raises the handles 18a, 18b to provide sufficient clearance for the framework 22 above the ground.

As evidenced by the above, the hitch device 10 establishes a wheelbarrow hitch angle between the tow vehicle 14 and the wheelbarrow 12 (i.e., the angle established between a plane of the vehicle's hitch plate 94 (typically parallel with ground) and the angular orientation of the wheelbarrow handles 18a, 18b). This angle can be useful in creating the necessary amount of ground clearance at the wheelbarrow framework 22, especially where extreme and/or abrupt ground variation conditions are present (and thus requiring substantial framework 22 ground clearance). Further, the wheelbarrow framework 22 should be sufficiently high (above ground) for necessary clearance, but not surpass the desired slope of the tub 16 for some material hauling projects. These desirable attributes can be complicated by the variations in hitch plate 94 elevations between vehicle types. For example, the hitch plate 94 (or similar structure) associated with a riding lawn tractor is typically lower than the elevation of an ATV hitch plate.

The above-described height variations can be addressed by the hitch devices of the present disclosure in various manners. For example, the hitch device 10 can be fabricated and sold in two formats: one for ATVs and a second for lawn tractors. Alternatively, the hitch device 10 can include an adjustment feature that allows a user to select a desired angle between the handle captures 50 and the tow bar 32, thereby promoting use of the hitch device 10 with differing vehicle types and/or with extreme ground variation environments. The adjustment feature can have various forms, such as pins or bolts at the cross bar 52 that allow a user to select a desired angle.

In yet other embodiments, an adaptor can be employed with the hitch device. For example, FIG. 5A illustrates an adaptor 110 useful with the hitch device 10 and deployed in a manner addressing the lower elevation of the hitch plate 94 associated with a conventional lawn tractor 14. Notably, the adaptor 110 can be reversed as shown in FIG. 5B for use with a higher elevation, such as with the hitch plate 94 of a conventional ATV (not shown). The adaptor 110 interconnects the hitch device 10 with the wheelbarrow handles 18 (one of which is visible in FIG. 5B). Use of the adaptor 110 with a higher elevation vehicle provides added clearance that may be beneficial in various environments, such as in-forest hauling to clear branches, on-sand hauling where the wheelbarrow tires are susceptible to "rutting" in the ground surface, etc. In other instances, the adaptor 110 can be omitted (such that the adaptor 110 effectively provides three different height variations).

Hitch devices in accordance with the present disclosure can assume other forms differing from the descriptions above. For example, FIG. 6 illustrates an alternative hitch device 10' incorporating a gusset feature 120. The hitch device 10' is highly akin to the hitch device 10 (FIG. 2) described above, including the engagement members 40a, 40b configured for releasable mounting to the wheelbarrow handles 18a, 18b. The gusset feature 120 is provided with the second engagement members 40b (as shown, for example, in FIG. 7) that is otherwise permanently affixed to the tow bar 32. The gusset feature 120 can be a plate welded or secured to the tow bar 32, and serves as a brace. Other diagonal bracing methods are also contemplated. The gusset 120 or other brace may optionally be used to add strength to the first engagement member 40a that is otherwise not permanently affixed to the tow bar 32. These optional bracing features additionally help to prevent twisting in the case of a sideways overload. Further, the gusset 120 can be welded at the end of the tow bar 32 to provide additional welding surface area by capping the end of the tow bar 32. Even further, this tow bar bracing option can be shaped to act as a stop for the first engagement member 40a to better align the connector holes 70 for easier assembly.

The hitch devices of the present disclosure uniquely provide advantages over other wheelbarrow hitch concepts. It is more quickly applied, simpler made, more readily stored, more easily shipped, more easily understood, more dependably assembled, and more efficiently and cost effectively produced. Other wheelbarrow-hitch design patents, provisional applications, and one abandoned application do not use this zero-fastener surround on the handles and angle-ofhandle dependent method and lack the benefits of this unique design. The wedge structure is contemplated in various layouts but the effective binding on the handles remains. For example the extensions from the handle surrounds may continue to the middle for connection as shown in the drawings or continue directly to the hitch where they are adjoined. The adjoining may create the hitching means for ball or pin designs.

This wheelbarrow hitch invention securing means at the wheelbarrow end is dependant only on the upward and outward common separation of the handles. The surrounding handle fixed spacing eliminates the need used by other designs for direct fasteners to the wheelbarrow. The surrounding means at the handle and resulting wedge to retain the wheelbarrow's orientation for trailing without troublesome mechanics and user activities and often tools to affix a hitch is advantageous. The device is commonly shorter, less complex, less heavy, requires fewer parts, and generally is more accessible for user attachment and detachment or storage when attached to or removed from a wheelbarrow than other designs.

In the case of the 'T' shaped version of the tow bar it maintains the user option to leave it in place and walk with legs on either side of the hitch bar. The user will need to step to one side for dumping activities in the forward direction but for light loads or for some applications like side tipping this is acceptable.

Tow bar hinging with locking or detachment pins or other common mechanisms between the handle surround and cross members and various tow bar design options to permit easier use with attachment are contemplated.

The device is designed so that when attached it retains trailing orientation between wheelbarrow and powered vehicle to provide ground clearance for wheelbarrow legs while sufficiently retaining the wheelbarrow tub angle in all directions typical to manual operations. Product with differing angles accommodates variations hitch height requirements. A single design with hitch angle adjustment is contemplated.

In some embodiments, the present disclosure contemplates the hitch assembly incorporate sliding tubes as the tow bar. The tow bar can be affixed to the cross member by a through hole and pin. The tow bar can be composed of two flat stock bent in curves and connected to create the strength required for the task. The surround on the handles can be created by a clamping second part mounted on the hitch device.

The present disclosure contemplates rings, tubes, angles, or bent bar stock around the handle to provide the handle capture means. In any case the surrounding means of the two handles are affixed together so they are unable to slide inward or outward and eliminates the need to incorporate fasteners at the handle. The invention provides the ability of the tow bar wedge design to retain the angle using the handle surrounding means to retain the device at a location of the handles when connected to the hitch or hitching means. The created angle of the device to the handles permits this method to work as retention in all aspects as required for towing. This can be considered as a fixed wedging method.

In other embodiments, the present disclosure includes retaining the handle capture or fixed wedging by the use of a one of a variety of user releasable catch methods between the two handle surround means. Handle surround means can be but is not limited to hooks, tubes, hoops, and angle catches. Further, the handles can be gripped by tubes welded to flat bar stock and one of these flat bar stock is affixed to the tow bar and the opposing side is affixed to welded side by a center pin.

The invention contemplates a design where a cross member between the handles is slotted to retain the handles and middle connection permits slide on/off and is held by a retention pin in the center or with a fixed length section held by pins on the outside of the handles. For example a pipe or tube with handle slots at the ends and retention pinholes and pins permits a version of the invention with less or even no welding for ease of manufacture, shipping and use. In any case, there is no attachment directly to the handle as the design still depends on the affixed angle surrounding the handles as the trailer retention method by wedging the handles.

The present disclosure contemplates the surrounding means at the handle may be formed by bending the cross member to wrap the handle. These members may be rods or rounds singular or in pairs (or more) bent to form the surround and the cross member and the hitch tow bar member. For example a round steel rod may be bent to coil around the handle and then extend to the middle adjoining a similar part on the opposing side so that when attached together they form a typical to the drawing wedge framework for towing a wheelbarrow with a power vehicle.

In other embodiments, the use of one or both cross members with surrounding means can also be formed in such a way to continue on directly to create a trailer tow bar(s). The connection may be made closer to or even at the hitch. Thereby, the present disclosure contemplates the use of two-part tow bar components and where the two are adjoined at the hitch point.

Some devices of the present disclosure are advantageous because the permits the user to more readily move between trailer and manual wheelbarrow activities without tools. However, in one variation a one time adjustment providing for handle size may require tools, but in any case does not require tools for use thereafter. The device quickly assembles and disassembles yet provides sufficient support and direction for the wheelbarrow under full load or empty.

The hitch may remain in place when stored as a trailer on its legs or on the nose-down common wheelbarrow storage position. In either case it eliminates the need for a second trailer purchase and storage space. This hitch device solution may be especially desirable when used on a two-wheeled wheelbarrow. Devices of the present disclosure provide double use of a wheelbarrow as common manual practice or as a power vehicle trailer. They do so by the unique application of dual surround handle capturing means affixed by angle wedge alone to create the hitch towing hitch device. By this method of zero-direct fastening system permits quicker application, lower purchasing cost than other tow bar concepts or secondary trailer purchase, less storage space than other trailer and wheelbarrow concepts, offers intermittent changes to/from manual and powered hauling based on field conditions, and does so with a no-tools-required to attach/detach tow bar. This solution more appropriately addresses user needs and desires as previously described.

The devices of the present disclosure optionally permit manual use even with the hitch attached. The devices are more easily accessed for application than other designs for connection or disconnection, and can be accomplished using fewer parts than other concepts. The assembly requires very little or no training. It assembles in an intuitive and simple to understand way. Finally, devices of the present disclosure provide a strong and secure connection between the wheelbarrow structure and the powered vehicle hitch.

The devices may use a standard farm or ball type hitch at the powered vehicle. It is contemplated a two-part tow bar stem may join at the hitch to also create the pivot and catch point with either of these methods. In this case the binding at the handles is triangulated to the hitch point to affix the two sides from sliding off the end of the handles. Similarly, some of the devices of the present disclosure may use any of a number of standard sized steel shapes like square tubing as tow bar or drawbar. This may be bent as required/desired to best position the wheelbarrow for ground clearance based on the power vehicle hitch height. The surrounding handle capture shape may be custom manufactured or one-time user adjusted to fit a variety of handle cross-section sizes.

Optionally the materials used for the tow bar design may use plastic tubing (typical ABS) for either or both drawbar/tow bar and cross member. Optionally another device version may use a one-time bolted assembly. For example the steel plate cross member at the drawbar/tow bar or tubes at wheelbarrow handles may be bolted vs. welded. Optionally the cross member shaped to catch handles may incorporate catch devices to keep them from sliding off. For example one or two outside handle pins may be used on the cross member to 'catch' the handle(s) to effectively create the same purpose as over-handle tubes or opposing angle shaped 'catches'. In any case between the handle surrounds and the hitch a binding force wedge is created. This binding force eliminates the fasteners directly bolting the trailer hitch to the wheelbarrow contemplated by other designs.

One can use a surround handle capturing means design that slides on a single piece cross member by having channels on the ends for each handle. These channel ends have through-hole pins at the far ends to enclose the handle creating a typical handle surround concept.

It is contemplated that a hole in the cross member may be used to attach the drawbar/tow bar. This would be made at an angle appropriate to lift the wheelbarrow legs off the ground when attached to the power vehicle hitch point. A pin attachment through the insertion crossing can be used for quick assembly.

The user can apply the tow bar and connect the assembled trailer to the power vehicle hitch. Optionally the user can leave the trailer hitch attached to the power vehicle and disassemble the hitch at the cross member by removing the connection pin leaving the handle surround and cross member attached to the wheelbarrow handles. This allows the user to perform forward direction dumping activities without stepping to one side.

Although the hitch devices of the present disclosure have been described with reference to preferred embodiments, workers skilled in the art will recognize that changes can be made in form and detail without departing from the spirit and scope of the present disclosure. For example, in other embodiments the hitch does not use a separate cross member other than the twin tow bars that become their own cross member and form to keep the 'captures' from sliding off. The capture around the handle is unable to twist or pivot as would be required to slide off when pulled or to go toward the wheelbarrow when pushed (backing up). With these alternative hitch designs, two elongated tow bars each including a handle capture configured to slidably receive a wheelbarrow handle at one end are provided, with at least one of the elongated tow bars including a vehicle coupling assembly at the other end. A vehicle coupling assembly configured for selective mounting to a vehicle frame is also provided. Assembly of the hitch device to a wheelbarrow includes the handle captures being slidably received over a respective one of the wheelbarrow handles and fastened to one another at the hitch to connect the two tow bars such that the hitch device is mounted to the wheelbarrow handles in a wedge-like fashion.

What is claimed is:

1. A hitch device for converting a conventional wheelbarrow having a tub, handles and at least one wheel, into a towable trailer, the hitch device comprising:
    an elongated tow bar;
    first and second engagement members each including:
        a handle capture configured to slidably receive a wheelbarrow handle,
        a cross bar maintaining the handle capture,
        a base projecting from the cross bar,
        wherein the first engagement member is separate from the tow bar and the second engagement member is affixed to the tow bar; and
    a vehicle coupling assembly configured for selective mounting to a vehicle frame;
    wherein assembly of the hitch device to a wheelbarrow includes the handle captures being slidably received over a respective one of the wheelbarrow handles and the bases fastened to one another to connect the first engagement member with the tow bar such that the hitch device is mounted to the wheelbarrow handles in a wedge-like fashion.

2. The hitch device of claim 1, wherein the handle capture is a sleeve-type body.

3. The hitch device of claim 1, wherein a central axis of the handle capture is non-parallel relative to a plane of the base.

4. The hitch device of claim 1, wherein the base projects from the cross bar in a direction opposite a direction of extension of the corresponding handle capture from the corresponding cross bar.

* * * * *